L. W. CHUBB.
ROTARY CONVERTER.
APPLICATION FILED JULY 6, 1915.

1,257,977.

Patented Mar. 5, 1918.
6 SHEETS—SHEET 1.

WITNESSES:

INVENTOR
Lewis W. Chubb
BY
ATTORNEY

L. W. CHUBB.
ROTARY CONVERTER.
APPLICATION FILED JULY 6, 1915.

1,257,977.

Patented Mar. 5, 1918.
6 SHEETS—SHEET 2.

WITNESSES:
Fred H Miller
D.C. Davis.

INVENTOR
Lewis W. Chubb
BY
Wesley G Carr
ATTORNEY

L. W. CHUBB.
ROTARY CONVERTER.
APPLICATION FILED JULY 6, 1915.

1,257,977.

Patented Mar. 5, 1918.
6 SHEETS—SHEET 3.

WITNESSES:
Fred H. Miller
D. C. Davis.

INVENTOR
Lewis W. Chubb
BY
Wesley G. Carr
ATTORNEY

L. W. CHUBB.
ROTARY CONVERTER.
APPLICATION FILED JULY 6, 1915.

1,257,977.

Patented Mar. 5, 1918.
6 SHEETS—SHEET 4.

WITNESSES:
Fred H Miller
D.C. Davis

INVENTOR
Lewis W. Chubb
BY
Wesley G. Carr
ATTORNEY

L. W. CHUBB.
ROTARY CONVERTER.
APPLICATION FILED JULY 6, 1915.

1,257,977.

Patented Mar. 5, 1918.
6 SHEETS—SHEET 5.

WITNESSES:
Fred H Miller
D.C. Davis

INVENTOR
Lewis W. Chubb
BY
Wesley G. Carr
ATTORNEY

L. W. CHUBB.
ROTARY CONVERTER.
APPLICATION FILED JULY 6, 1915.

1,257,977.

Patented Mar. 5, 1918.
6 SHEETS—SHEET 6.

WITNESSES:

INVENTOR
Lewis W. Chubb
BY
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

ROTARY CONVERTER.

1,257,977.

Specification of Letters Patent. Patented Mar. 5, 1918.

Application filed July 6, 1915. Serial No. 38,120.

*To all whom it may concern:*

Be it known that I, LEWIS W. CHUBB, a citizen of the United States, and a resident of Edgewood Park, in the county Allegheny and State of Pennsylvania, have invented a new and useful Improvement in Rotary Converters, of which the following is a specification.

My invention relates to rotary converters and to supply systems therefor, and it has for its object to provide means whereby the current neutralization and heat generation among the different armature conductors may be distributed and controlled in a simple and effective manner, resulting in a reduction of the average heating throughout the armature winding, a reduction of the temperature of the hottest coils at a given load, or both of these results simultaneously, thus allowing an increase in the rating of the machine.

Figure 1:
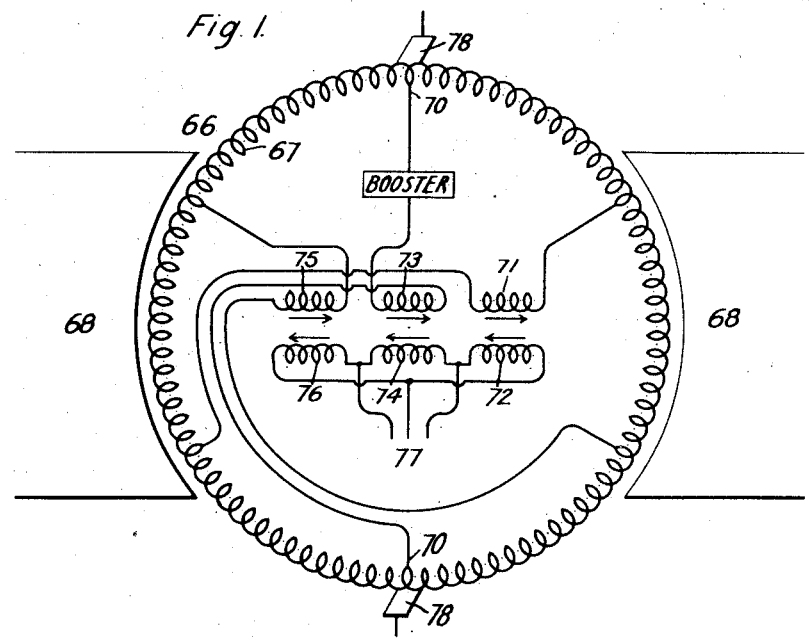
Figure 2:
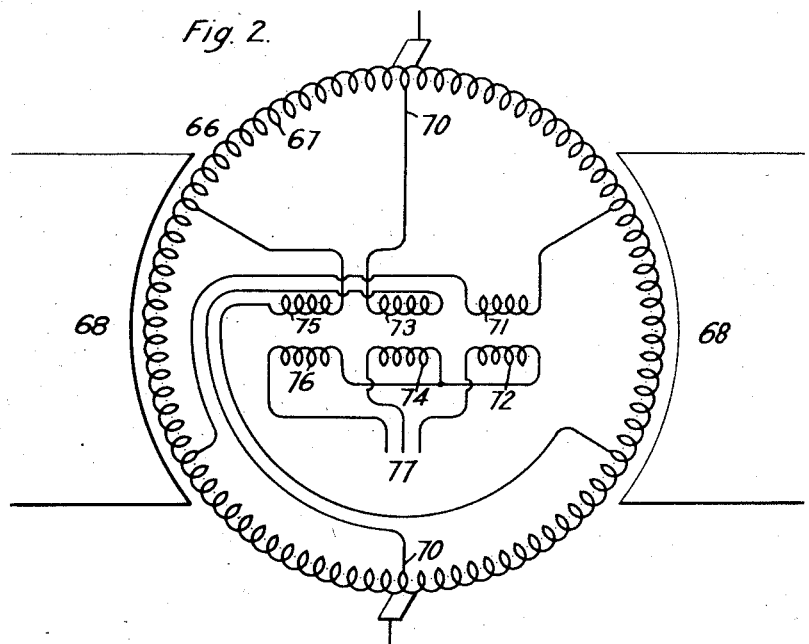
Figure 3:
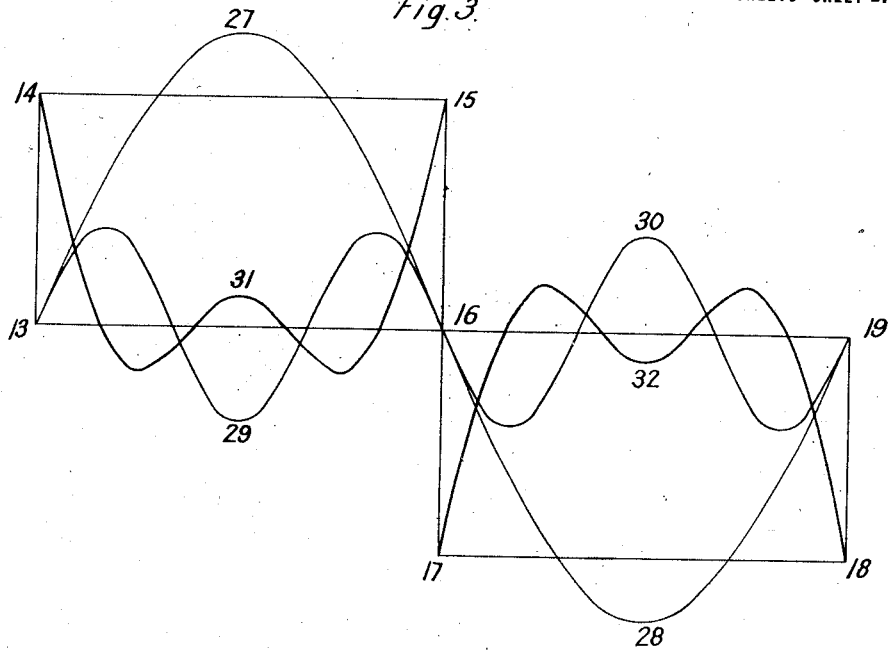
Figure 4:
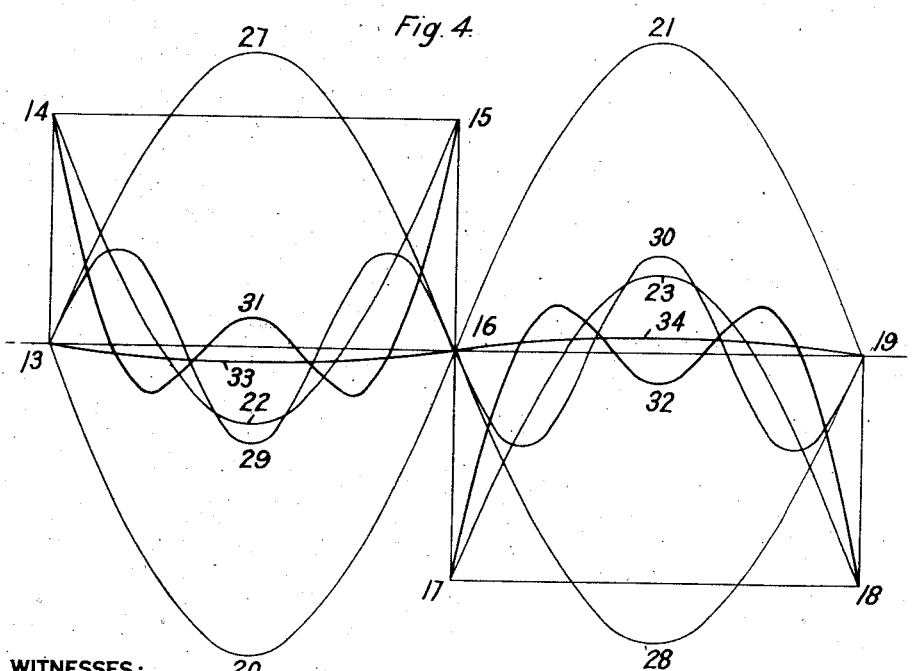
Figure 5:
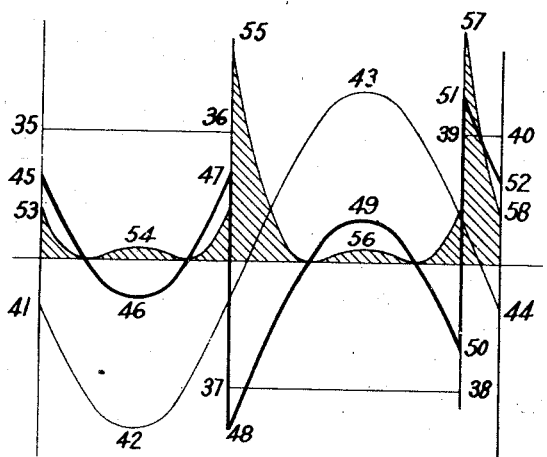
Figure 6:
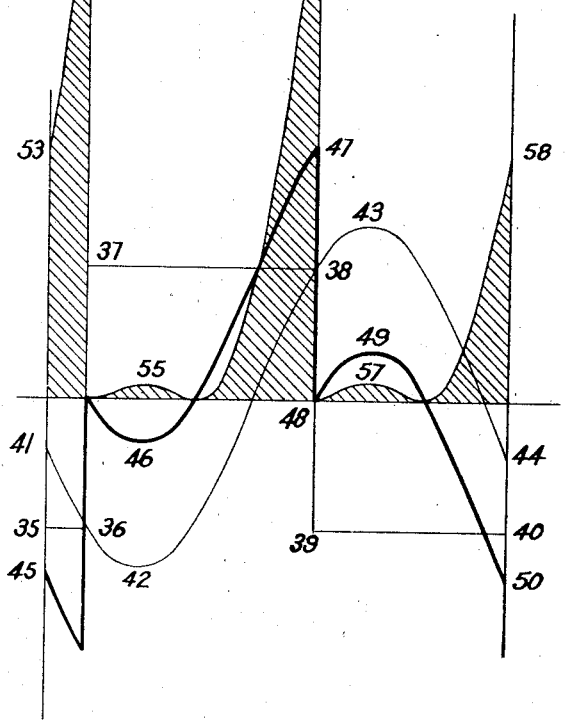
Figure 8:
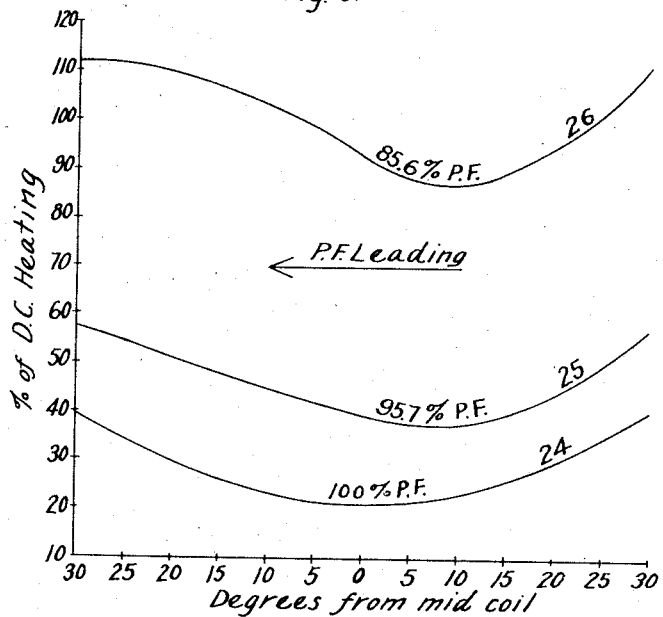
Figure 7:
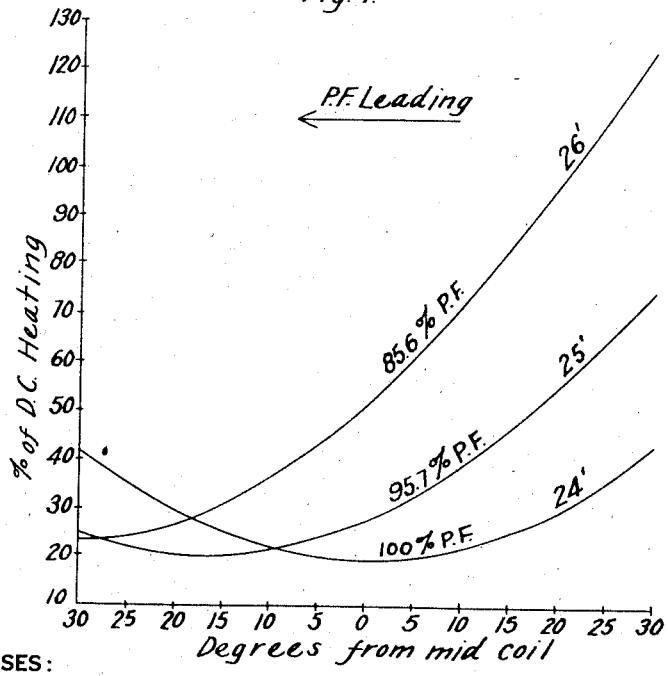
Figure 9:
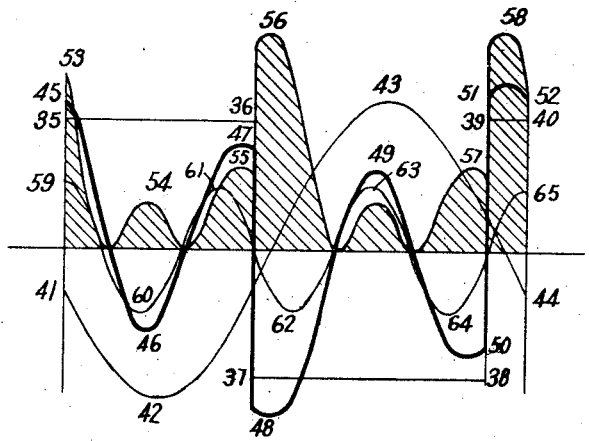
Figure 10:
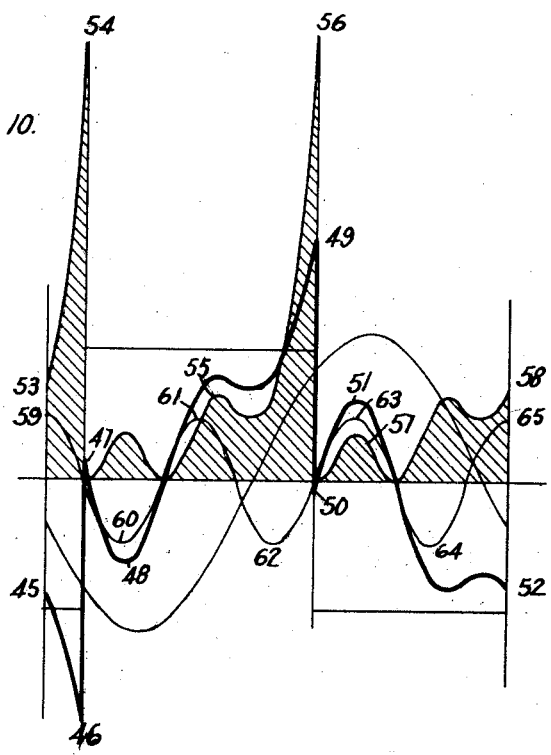
Figure 11:
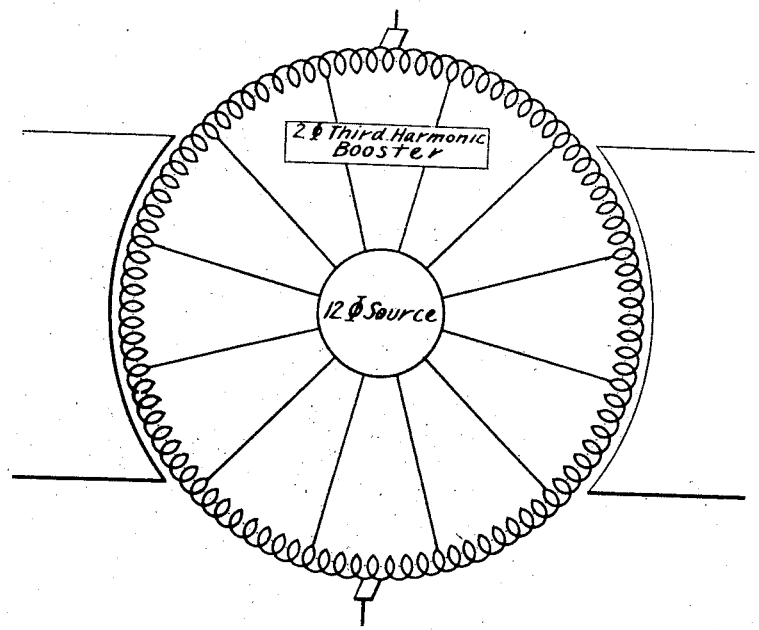
Figure 12:
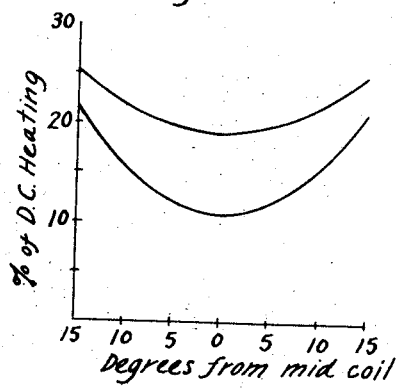

Referring to the accompanying drawings, Figure 1 is a diagrammatic view of a rotary converter, together with a delta-diametrical supply system therefor, embodying an upper harmonic booster, illustrating one form of my invention; Fig. 2 is a view similar to that of Fig. 1 but shows a supply system of the star-diametrical type; Fig. 3 is a diagram illustrating the partial graphic analysis of a square-top periodic wave; Fig. 4 is a diagram illustrating a possible method of current cancellation that may be employed in rotary converters in accordance with my invention; Fig. 5 is a diagram illustrating graphically the heating in an armature coil immediately behind an alternating-current tap in an ordinary rotary converter operating with a leading power factor of 95.7%; Fig. 6 is a similar graphical illustration of the heat generated in an armature coil immediately in advance of an alternating-current tap at a like power factor; Fig. 7 is a diagram showing the average heating throughout the various armature conductors in a rotary converter which does not embody my invention; Fig. 8 is a diagram similar to that of Fig. 7 showing the average heating of the different armature coils in a rotary converter arranged in accordance with my invention for equal tap heating at different degrees of power factor; Figs. 9 and 10 diagrams illustrating graphically the method in which I am enabled to equalize the heating in armature coils immediately in advance of and immediately behind the armature taps in a rotary converter operating at 95.7% power factor by the use of circulating third harmonic currents; Fig. 11 is a diagrammatic view of a twelve-phase rotary converter embodying my invention; and Fig. 12 is a diagram showing graphically the improvement which may be effected in both the average and maximum heating of a twelve-phase rotary converter by the use of my invention.

In the ordinary rotary converter, if the effects of the converter losses are neglected and if the alternating-current supply is at unity power factor, a square-top direct-current wave of output and an alternating-current wave of input tend to flow in an armature coil midway between alternating-current taps, the respective directions of flow opposing each other because of the fact that one is a driving and the other is a generated current. There is, therefore, a more or less perfect cancellation or neutralization of current in a mid coil. So long as current flow in a mid coil is considered, under the conditions assumed, the direct and alternating-current waves are in phase with each other because the direct-current wave necessarily reverses when passing under a brush and the alternating-current wave necessarily reverses at a point midway of the pole faces, which is also the brush position.

The extent of the current cancellation in the mid coil of a two-pole single-phase converter is shown graphically in Fig. 4 wherein a square-top wave 13—14—15—16—17—18—19 represents the direct current tending to flow, having an assumed maximum amplitude of 1, and the curve 13—20—16—21—19 represents a fundamental alternating-current input wave in phase therewith and having a maximum amplitude of 1.333. The net resultant current is shown by a curve 13—14—22—15—17—23—18—19, all as is well known and understood in the art.

An inspection of Fig. 4 will show that the cancellation shown is the maximum attainable and that any phase displacement of the current waves with respect to each other in either direction will result in a greater net current and heating. Two factors cause such phase displacement, as follows: In any coil other than a mid coil, the alternating-current wave is in phase with that in the mid coil, all turns between two alternating-current taps being in series relation. On the other hand, the direct-current in any coil reverses when said coil passed under a brush, or, in other words, there is a small phase displacement between the square-top direct-current waves in each succeeding coil. As the alternating-current waves and the direct-current wave are in phase with each other for mid coil, it follows that they are out of phase to a greater and greater degree as one leaves the mid coil and approaches a tap coil, with resultant greater and greater heating. For a standard six-phase rotary, the increase in heating, as one passes from mid coil to tap coil at unity power factor, is graphically shown in a curve 24′ in Fig. 7, plotted in percentage of the heating as a direct-current generator.

Imperfect current cancellation is also influenced by the power factor of the alternating-current input. The electromotive force of the alternating input is in phase with the direct-current wave of the mid coil and, therefore, if the alternating-current wave is displaced with respect to its E. M. F. wave, a less effectual cancellation will take place than is shown in Fig. 4 for the mid coil, and the influence will be marked on all the other coils, in one direction serving to neutralize the effect of displacement from mid position and in the other direction serving to accentuate the same feature. This is illustrated in the curves 25′ and 26′ in Fig. 7, plotted for power factors of 95.7% and 85.6%, respectively, showing that, if the power factor is leading, a coil immediately behind an alternating-current tap has its current reduced and one immediately ahead of a tap has its current increased.

The relative magnitudes and phase relations of the various current waves of a standard six-phase rotary converter are shown in Figs. 5 and 6 for the coils immediately following and immediately preceding an alternating-current tap at a fundamental power factor of 95.7% leading. In Fig. 5 a square-top direct-current wave 35—36—37—38—39—40, having an assumed amplitude of unity, is shown displaced from an alternating-current fundamental current wave 41—42—43—44 having a maximum amplitude of 1.333 by an angle of 30°−16° 50′=13° 10′, producing a net resultant current 45—46—47—48—49—50—51—52. By squaring the ordinates of the resultant curve, the heating curve 53—54—55—56—57—58 is obtained, the shaded area thereunder representing the heat. The average height of the shaded area is .246 indicating a resultant heating of 24.6% of that in the same coil when operating as a direct-current generator giving the same output.

In like manner in Fig. 6, wherein there is a displacement of 30°+16° 50′=46° 50′, a heating curve is obtained which determines an area having an average height of .756 indicating that the heating in a coil immediately preceding an alternating-current tap is 75.6% of that when operated as a direct-current generator.

Because of the fact that there is a more or less perfect cancellation of the input and output currents in a rotary converter, it is possible to operate a machine of this character with a much larger output for a given temperature rise than were it being driven as a direct-current generator. As above pointed out, the maximum heating occurs in the armature coils adjacent to the alternating-current taps which, therefore, determine the safe operating load of the machine as a rotary converter. Any method, therefore, whereby the heating of the tap coils may be reduced, even at the expense of increasing the heating in the mid coils, will allow a higher permissible rating in the machine and a consequent reduction in size and weight for a given output. The advantages to be gained by the reduction in size and weight are such as to even justify an actual increase in the total average heating, provided said heating is more or less uniformly distributed throughout the winding.

By my invention, I produce circulating third-harmonic current waves in the electrical circuits between the rotary converter and the secondary windings of its supply transformers, either by a special triple frequency booster or by a suitable adjustment of the electrical constants of said electrical circuits. By suitably adjusting the amplitude and phase of the circulating third-harmonic current waves, I am enabled to reduce the tap-coil heating in a six-phase rotary converter and, furthermore, the advantages of leading power factor may be obtained with equal tap heating of a reasonable amount or I may, if desired, reduce the average heating without an increase in the tap-coil heating on unity power factor. With the twelve-phase rotary converter, I am enabled to simultaneously reduce the tap-coil heat and the average heat throughout the armature windings by the proper selection and manipulation of upper-harmonic current waves.

The square-top direct-current wave tending to flow in the armature conductor of a rotary converter is a constantly recurring periodic function and may, therefore, be analyzed in accordance with Fourier's series into the sum of an infinite number of sine waves represented by the expression $$\frac{4}{\pi}\sin\theta + \frac{4}{3\pi}\sin 3\theta + \frac{4}{5\pi}\sin 5\theta + \frac{4}{7\pi}\sin 7\theta \ldots$$

Fig. 3 shows graphically the first steps in this harmonic analysis. The square-top wave 13—14—15—16—17—18—19 is equivalent to the sum of a fundamental sine wave $$\frac{4}{\pi}\sin\theta,$$

represented by a line 13—27—16—28—19; a third harmonic wave $$\frac{4}{3\pi}\sin 3\theta,$$

represented by a line 13—29—16—30—19; and a residual wave $$\frac{4}{5\pi}\sin 5\theta + \frac{4}{7\pi}\sin 7\theta \quad \ldots \quad (1)$$

represented by a line 13—14—31—15—16—17—32—18—19 and containing the fifth and all higher harmonics. The fundamental component $$\frac{4}{\pi}\sin\theta$$

of the direct-current wave is in exact opposition to the alternating-current supply wave in the mid coil of a rotary-converter winding when operating at unity power factor as shown by lines 13—27—16—28—19 and 13—20—16—21—19 in Fig. 4. The alternating-current supply wave has a value represented by the expression $$-\frac{4}{3}\sin\theta$$

and, when evaluated, has a value —1.333 sin θ, as compared with the simultaneous instantaneous magnitude of the direct-current fundamental of 1.274 sin θ. It is therefore seen that there is an approximate cancellation between these two waves, the net difference being shown by a line 13—33—16—34—19 in Fig. 4. The remaining uncanceled portion of the direct-current wave is shown by a line 13—14—22—15—17—23—18—19 in Fig. 4, being the sum to infinity of the third and higher-harmonic components together with the uncanceled fundamental current 13—33—16—34—19. It may be readily shown that the third and higher components, when squared, represent 18.9% of the heating of the mid coil when operating solely with a direct-current wave as when driven as a direct-current generator. The sum to infinity of the fifth and higher direct-current components, forming the line 13—14—31—15—17—32—18—19, when squared, amounts to but 9.9% of the direct-current heating. It is therefore obvious that a radical reduction in mid coil heating could be produced by establishing a circulation of third-harmonic current in the armature winding which would, at all times, have equal and opposite values to the triple-frequency component represented by the lines 13—29—16—30—19. As above pointed out, however, while this may be a highly advantageous procedure, in so far as the mid coils are concerned, the injection of a third-harmonic current wave of the character described would exert a harmful influence in increasing the heating of the tap coils and, as the latter determine the rating of the rotary converter, it is essential that some other phase relation of the third harmonics be chosen in order to obtain the desired results.

If the current in the mid coil is $$1.333\sin\theta = A_{\prime}\sin\theta,$$

the alternating current in any coil removed from the mid coil by an angle $\phi$ is $$i_a = A_{\prime}\sin(\theta+\phi) = A_{\prime}\sin\theta\cos\phi + A_{\prime}\cos\theta\sin\phi$$

The direct current in any coil is $$i_d = \frac{4}{\pi}\sin\theta + \frac{4}{3\pi}\sin 3\theta + \frac{4}{5\pi}\sin 5\theta \quad \ldots \quad (3)$$

$\theta = 0$ when the coil passes a brush.

The composite current is then $$i = \left[\left(\frac{4}{\pi} + A_{\prime}\cos\phi\right)\sin\theta\right] + (A_{\prime}\sin\phi\cos\theta) + \frac{4}{3\pi}\sin 3\theta + \frac{4}{5\pi}\sin 5\theta \quad \ldots \quad (4)$$

The heating in any coil is $$i^2 = \frac{\left(\frac{4}{\pi} + A_{\prime}\cos\phi\right)^2}{2} + \frac{(A_{\prime}\sin\phi)^2}{2} + .189 \quad \ldots \ldots \ldots \ldots (5)$$

where .189 is the aggregate heating of the third and higher harmonics of the direct current. At the tap coil in a six-phase rotary, $$\phi = 30° = \frac{\pi}{6}$$

$i^2 = .418 = 41.8\%$ of D. C. heating when $A_{\prime} = -1.333$.

The average heating will be $$\frac{\int_0^{\frac{\pi}{6}} i^2 d\phi}{\frac{\pi}{6}} = \frac{\frac{1}{2}\int_0^{\frac{\pi}{6}}\left[\left(\frac{4}{\pi}-\frac{4}{3}\right)\cos\phi\right]^2 d\phi + \frac{8}{9}\int_0^{\frac{\pi}{6}}\sin^2\phi\, d\phi + .189\int_0^{\frac{\pi}{6}} d\phi}{\frac{\pi}{6}} \quad \ldots \ldots (6)$$

$$= .268 = 26.8\%$$

Passing now to the effects of other than unity power factor, the heat in any coil at an angle $\phi$ from the mid coil with any value of circulating third-harmonic current is $$i^2 = \frac{D_1^2}{2} + \frac{A_1^2}{2} + \frac{B_1^2}{2} + D_1 A_1 \cos\phi - D_1 B_1 \sin\phi + \frac{D_3^2}{2} + \frac{A_3^2}{2} + \frac{B_3^2}{2} + D_3 A_3 \cos 3\phi - D_3 B_3 \sin 3\phi + .099 \quad (7)$$

where $D_1 = \frac{4}{\pi}$, $D_3 = \frac{4}{3\pi}$, $A_1$ and $B_1$ are respectively the sine and cosine components of the fundamental, $A_3$ and $B_3$ are respectively the sine and cosine components of the third harmonic, and .099 is the aggregate heating of the fifth and higher harmonics.

If
$$B_1 = \frac{-2D_3 B_3}{D_1}$$

the taps will have equal heating, and for equal tap heating, the heating in any coil will be $$i^2 = \frac{D_1^2}{2} + \frac{A_1^2}{2} + \frac{2D_3^2 B_3^2}{D_1^2} + D_1 A_1 \cos\phi + 2D_3 B_3 \sin\phi + \frac{D_3^2}{2} + \frac{A_3^2}{2} + \frac{B_3^2}{2} + D_3 A_3 \cos 3\phi - D_3 B_3 \sin 3\phi + .099 \quad (8)$$

It is now necessary to determine the magnitude and phase relation of the third harmonic of current to be circulated to equalize the unbalanced tap heating of the fundamental alternating current caused by its low power factor. In the first place, the fundamental alternating-current wave should be somewhat lowered in order to cancel more effectively the fundamental component of the direct-current wave at the tap coils. This lowering of the fundamental current from 1.333 may be obtained by flatting the voltage wave thereof with a sine component of third-harmonic voltage produced by the inductive drop of a pure cosine component of third-harmonic circulating current having a maximum amplitude dependent upon the inductance of the converter armature.

Applying these principles over the ordinary range of power factor, the following table may be computed, showing the desired phase and magnitude of circulating current the power factor being the fundamental power factor between the converter and the transformers and the true power factor in the line.

| $A_1$ | $B_1$ | $A_3$ | $B_3$ | P. F. |
|---|---|---|---|---|
| −1.103 | −0 | 0 | .0 | 1.00 |
| " | −.0666 | 0 | .1 | .999 |
| " | −.1333 | 0 | .2 | .998 |
| " | −.200 | 0 | .3 | .984 |
| " | −.266 | 0 | .4 | .972 |
| " | −.333 | 0 | .5 | .957 |
| " | −.400 | 0 | .6 | .940 |
| " | −.667 | 0 | 1.0 | .856 |

The effects of circulating third-harmonic currents derived in this manner to equalize unbalanced tap heating for leading fundamental power factors of 95.7% and 85.6%, respectively, are shown in curves 25 and 26 in Fig. 8, which are self-explanatory.

In order to more clearly bring to the eye the exact method in which equalization of tap heating is brought about by the circulating third-harmonic currents, I have shown, in Figs. 9 and 10, respectively, the conditions in the armature coils immediately following and immediately preceding an alternating-current tap in a six-phase rotary converter at a fundamental leading power factor of 95.7%, following, so far as possible, the arrangement and notation of Figs. 5 and 6. In each figure a pure cosine component of third-harmonic current 59—60—61—62—63—64—65 is introduced, resulting in such modification of the resultant current that the areas under the squared ordinate heating curves 53—54—55—56—57—58 are equal, each having an average height of .575 indicating 57.5% of direct-current heating, in agreement with the curve 25 in Fig. 8.

It will thus be seen that, by proper overexcitation to obtain 95.7% leading power factor, a radical improvement in the line regulation may be effected, and, at the same time, the machine may be operated at a more nearly constant coil temperature than would be possible under normal operating conditions, as shown in Figs. 6 and 7.

The circulating third-harmonic currents exert no influence on the external circuits in a delta-diametrically connected converting system. As shown in Fig. 1, a rotary converter 66 is provided with an armature winding 67 and field poles 68 excited by any suitable means (not shown). Alternating current is supplied to the winding 67 through suitable tap and slip rings (not shown) from the diametrically connected secondary members 71, 73 and 75 of suitable supply transformers having primary members 72, 74 and 76 deriving energy from mains 77. Direct current is removed from the winding 67 through suitable brushes 78. Third-harmonic current waves are set up in the connections between the winding 67 and the secondary windings 71, 73 and 75 by suitable adjustment of the electrical constants of said circuits or by a triple-frequency booster 79, of any desired construction, inserted in one of the leads. The third-harmonic current, at any instant, may be represented by arrows associated with the respective secondary windings. The currents induced thereby in the primary windings will assume the directions shown, tending to cause merely idle circulation in the delta of the primary windings.

The system of Fig. 2 is the same as that of Fig. 1 except that the transformers are arranged in a star-diametrical connection. With this connection, a rotary converter may be used having a sine component of third-harmonic voltage in the diametral voltage wave shape which will flatten the diametral voltage and contain an increased fundamental voltage, with resultant decreased fundamental current for the same brush voltage and load. A decrease in the maximum value of the fundamental current from 1.333 to 1.274 will cause a perfect cancellation of the fundamental components of current in the mid coil. There will be a tap heating of 40.5% and an average heating of 25.88%. With a further decrease of fundamental current to 1.163, the average heating is at its minimum value of 25.3%, and the taps have 39.3% heating. With 1.103 for fundamental current, the tap heating is reduced to a minimum of 39.1% and the average heating is 25.53%. For clearness, these results are tabulated as follows, together with the corresponding factors in direct-current generator and standard rotary-converter operation.

| Voltages. | | Currents A. C. side. | | % heating. | | Remarks. |
|---|---|---|---|---|---|---|
| $E_r$ | $E_s$ | $A_r$ | $A_s$ | Tap. | Average. | |
| 1 | 0 | 0 | 0 | 100.00 | 100.00 | As D.C. generator. |
| 1 | 0 | −1.333 | 0 | 41.82 | 26.79 | Standard rotary. |
| 1.045 | .045 | −1.274 | 0 | 40.54 | 25.88 | Min. heat in mid coil. |
| 1.145 | .145 | −1.163 | 0 | 39.35 | 25.35 | Min. average heating. |
| 1.209 | .209 | −1.103 | 0 | 39.17 | 25.53 | Min. tap heating. |

The adjustment for minimum tap heating appears to be most favorable for operation, effecting a marked saving in the heating for a certain output or permitting an increase in the rating for a given tap heating.

The twelve-phase converter, shown diagrammatically in Fig. 11, with a two-phase third-harmonic booster in two adjacent taps thereof, was carefully investigated and it was found that improvement in the heating of all conductors could be obtained by the use of circulating third-harmonic currents. The ordinary twelve-phase converter has a tap-coil heating of 25% of the heating when running as a D. C. generator, a mid-coil heating of 19.2%, and an average heating of 20.9%. This average heating can be lowered only as far as 20.7% by star-diametrical connection and a small third-harmonic voltage with no third-harmonic current circulating through the armature and the transformers. Under this condition, the tap coil will have 21.4% heating and the mid coil 11% heating, which is a great improvement over the standard twelve-phase converter and should be of commercial importance if the commutating problem for double capacity can be solved. Fig. 12 shows the heat diagram between successive taps of the standard and harmonic design of the twelve-phase converter at unity power factor on the high side. At fundamental power factors lower than 100% there is also a decided advantage in the harmonic design, but the harmonic current, if used to best advantage, must be so shifted as to correct for the reactive components of the fundamental current.

In a divisional application, Serial No. 184,246, filed August 3, 1917 and assigned to the Westinghouse Electric & Manufacturing Company, I present claims specifically directed to the injection of a sine component of current in a twelve-phase rotary converter.

I have pointed out the application of my invention to but a portion of the possible types of rotary converters but it will be obvious to those skilled in the art that the same general principles may be applied in the design of apparatus of the character indicated having various types of current supply systems and various numbers of operating phases.

I claim as my invention:

1. The combination with a rotary converter, of a source of alternating-current supply therefor, and means for producing current waves in the armature winding thereof having upper harmonic relation to the current waves of the alternating-current supply, said upper harmonic current waves having such a phase relation to the main supply waves as to equalize the heating of the tap coils at a power factor other than unity with leading current.

2. The combination with a source of alternating current, of a rotary converter connected thereto, and means for developing a third harmonic of current in the armature winding of said rotary converter, said third harmonic having a phase displacement of ninety electrical degrees from the supply current.

3. The combination with a source of alternating current, of a six-phase rotary converter connected thereto, and means for developing a third harmonic of current in the armature winding of said rotary converter, said third harmonic having a phase displacement of ninety electrical degrees from the supply current.

4. The combination with a source of alternating current, of a six-phase rotary converter connected thereto, and a third harmonic booster connected in one of the leads of said converter to develop third-harmonic current waves in the armature winding thereof, said harmonic waves having a phase displacement of substantially ninety electrical degrees with respect to the main current waves from said source.

5. The combination with a six-phase rotary converter, of delta-diametrically connected transformers for supplying alternating current thereto, and a third harmonic booster connected in one of the leads from said transformers to the armature winding of said converter, said booster circulating current waves in the local circuits between said converter and said transformers, and said current waves having triple frequency and substantially a ninety degree phase displacement with respect to the current waves of the main supply.

6. The combination with a rotary converter, of means for impressing upon the armature winding thereof a fundamental supply voltage of certain frequency and means for further impressing upon the armature winding thereof a cosine component of third-harmonic voltage in addition to said fundamental supply voltage, whereby the crest of said fundamental-voltage wave will be lowered and a more nearly perfect current cancellation in said armature winding will be effected.

7. The method of operating a rotary converter which comprises applying to the armature winding thereof alternating supply current of a certain frequency, over-exciting the field windings to produce power factor other than unity with leading current, and further applying a cosine component of alternating current to said armature winding having a frequency which is an odd multiple of that of said supply current and of such magnitude as to equalize the heating in the tap coils.

8. The method of operating a rotary converter which comprises applying to the armature winding thereof alternating supply current of a given normal frequency, over-exciting the field windings thereof to produce power factor other than unity with leading current, and further applying auxiliary alternating current to said armature winding having three times the frequency and substantially 90° phase displacement with respect to said supply current and of such magnitude as to substantially equalize the heating in the tap coils.

In testimony whereof, I have hereunto subscribed my name this 26th day of June 1915.

LEWIS W. CHUBB.